US010395851B2

(12) United States Patent
Qian et al.

(10) Patent No.: US 10,395,851 B2
(45) Date of Patent: Aug. 27, 2019

(54) METHOD FOR PREPARING AQUEOUS MNO₂ INK AND CAPACITIVE ENERGY STORAGE DEVICES COMPRISING MNO₂

(71) Applicant: The Hong Kong Polytechnic University, Kowloon, Hong Kong (HK)

(72) Inventors: Jiasheng Qian, Hong Kong (HK); Jikang Yuan, Hong Kong (HK); Shu Ping Lau, Hong Kong (HK)

(73) Assignee: The Hong Kong Polytechnic University, Kowloon, Hong Kong (HK)

(*) Notice: Subject to any disclaimer, the term of this patent is extended or adjusted under 35 U.S.C. 154(b) by 0 days.

(21) Appl. No.: 15/449,715

(22) Filed: Mar. 3, 2017

(65) Prior Publication Data

US 2017/0309411 A1    Oct. 26, 2017

Related U.S. Application Data

(60) Provisional application No. 62/324,892, filed on Apr. 20, 2016.

(51) Int. Cl.
*H01G 11/46* (2013.01)
*H01G 11/62* (2013.01)
(Continued)

(52) U.S. Cl.
CPC ............ *H01G 11/46* (2013.01); *H01G 11/62* (2013.01); *H01G 11/64* (2013.01); *H01G 11/86* (2013.01); *Y02E 60/13* (2013.01)

(58) Field of Classification Search
CPC ........ H01G 11/32; H01G 11/36; H01G 11/46; H01G 11/58; H01G 11/62; H01G 11/82; H01G 9/035; H01G 9/135
See application file for complete search history.

(56) References Cited

U.S. PATENT DOCUMENTS

2007/0202392 A1* 8/2007 Faubert .................. H01M 4/92
                                                                                429/483
2014/0017557 A1* 1/2014 Lockett ................. H01M 2/164
                                                                                429/189
(Continued)

FOREIGN PATENT DOCUMENTS

CN       101599370 A       12/2009
CN       103181016 A        6/2013
(Continued)

OTHER PUBLICATIONS

International Preliminary Report on Patentability dated Oct. 23, 2018 in corresponding PCT Application No. PCT/IB2017/051244.
(Continued)

*Primary Examiner* — Nguyen T Ha
(74) *Attorney, Agent, or Firm* — Mintz Levin Cohn Ferris Glovsky and Popeo, P.C.; Kongsik Kim; Joohee Lee

(57) ABSTRACT

In one aspect, the present disclosure relates to an improved method of preparing concentrated MnO₂ ink with increased efficiency and cost effectiveness. The method involves mixing KMnO₄ solution with highly crystalline carbon particles (HCCPs) with average diameters less than 800 nm at 30-60° C. for at least 8 hours. The present disclosure further relates to a symmetric supercapacitor device comprising MnO₂ coated electrodes and a solid state ionic liquid as electrolyte, as well as an interdigital transparent SC (IT-SC) device comprising aqueous MnO₂ ink.

11 Claims, 10 Drawing Sheets

(51) Int. Cl.
*H01G 11/64* (2013.01)
*H01G 11/86* (2013.01)

(56) References Cited

U.S. PATENT DOCUMENTS

| 2014/0212760 | A1* | 7/2014 | Zhao | H01M 4/583 |
| | | | | 429/231.8 |
| 2015/0287978 | A1* | 10/2015 | Lockett | H01M 8/16 |
| | | | | 429/224 |
| 2016/0336119 | A1* | 11/2016 | Kim | H01G 11/36 |

FOREIGN PATENT DOCUMENTS

| CN | 103219164 A | 7/2013 |
| CN | 104409225 | 3/2015 |
| CN | 104885172 A | 9/2015 |
| EP | 2 397 442 A2 | 12/2011 |

OTHER PUBLICATIONS

J. Qian et al., "Aqueous Manganese Dioxide Ink for Paper-Based Capacitive Energy Storage Devices", Chem. Int. Ed. 2015, 54(23), pp. 6800-6803.
Written Opinion dated Jun. 21, 2017 in corresponding PCT Application No. PCT/IB2017/051244.
International Search Report dated Jun. 26, 2017 in corresponding PCT Application No. PCT/IB2017/051244.

* cited by examiner

METHOD FOR PREPARING AQUEOUS MNO₂ INK AND CAPACITIVE ENERGY STORAGE DEVICES COMPRISING MNO₂

FIELD

The present disclosure generally relates to the preparation of an aqueous manganese dioxide ($MnO_2$) ink and $MnO_2$ ink based capacitive energy storage devices, with improved electrochemical properties.

BACKGROUND

The use of printing technology is of great interest in the various areas ranging from thin film transistors (TFTs), energy storage devices, solar cells to micro electro-mechanical system (MEMS). In this wide variety of applications, preparations of various inks comprising semiconductors, biological materials, carbon, and conductive oxides have been reported.

One exemplary potential candidate for use as ink in such printing technology in view of its abundance, high theoretical capacity and environmental compatibility is manganese dioxide ($MnO_2$).

$MnO_2$ is usually regarded as an ideal candidate for the electrode materials of portable devices, water treatment, up-conversion as well as photocatalysis.

Conventional $MnO_2$ electrodes are mainly prepared by two approaches:
(1) nanostructured $MnO_2$ or $MnO_2$-containing composite precipitates via a wet chemical process.

In this process, precursors are typically enclosed in a stainless steel autoclave at round 85° C. for 24 h. A flexible and free-standing composite paper could be prepared with high $MnO_2$ mass loading (Sumboja, et al., Adv. Mater., 25(20): 2809-2815 (2013)). This composite paper can serve as the electrode materials for the supercapacitor and achieve an areal capacitance of 897 $mF \cdot cm^{-2}$.
(2) direct electrodeposition or chemical deposition on various substrates (e.g. glass, quartz, copper or aluminum foil).

For example, $MnO_2$ has been electrodeposited on the surface of graphene to improve the conductivity of the electrode (Yu, et al., Nano Lett., 11(10): 4438-4442 (2011)).

However, these existing preparation methods for $MnO_2$ are relatively high cost, involve complicated processes and tend to include superfluous contamination from the preparation process.

Binders may also sometimes be added to increase the rigidity during the coating process. For example, a cathode composite ink comprised of electrolytic $MnO_2$, graphite and binder (polyvinylpyrrolidone (PVP), polytetrafluoroethylene (PTFE) or polyethylene oxide (PEO)) as described in US Published Application No. 2011/0274959. However, it is known in the art that the introduction of insulating binders would cause agglomeration in the inks, leading to the reduction of electrical conductivity and instability of the ink.

Accordingly, the goal of developing environmentally-benign and binder free $MnO_2$ ink remains unaddressed, which has prevented adoption of high-efficiency and large-scale printable processes using inks comprising $MnO_2$. Furthermore, due to an ever increasing demand for miniature and low cost power sources, there exists an ongoing need for a method of preparing $MnO_2$ ink with increased efficiency and yield.

There also exists a need for $MnO_2$ ink based energy storage devices with improved electrochemical properties, which may provide sufficient power to drive a device, such as a wearable device, LEDs and LCD clock(s).

Therefore, it is an object of the disclosure to provide an improved method of preparing concentrated $MnO_2$ ink addressing at least one or more of the above deficiencies, that would allow the synthesis of aqueous $MnO_2$ ink more efficiently and at a lower production cost.

It is a further object of the disclosure to provide a device having one or more $MnO_2$ components, together with an electrolyte of ionic liquid.

It is a further object of the disclosure to provide an interdigital transparent SC (IT-SC) device comprising aqueous $MnO_2$ ink.

SUMMARY

An aspect of the disclosure pertains to a method of preparing $MnO_2$ ink that comprises providing highly crystalline carbon particles (HCCPs) with average diameters less than 800 nm; mixing $KMnO_4$ solution with the HCCPs at 30-60° C. for at least 8 hours; and further increasing the temperature of the resultant suspension to 60-90° C. for 30-60 minutes, followed by cooling and filtration.

The resultant suspension can be maintained at 60-80° C. for 30-60 minutes. The $KMnO_4$ solution can be mixed with the HCCPs for 8-12 hours. Optionally, the method can further comprises the step of adding pure ethanol to the resulting solution to precipitate $MnO_2$; and redissolving precipitated $MnO_2$ to obtain $MnO_2$ ink in the desired concentration. In a preferred embodiment, redissolving of the precipitated $MnO_2$ to obtain $MnO_2$ ink in the desired concentration can be performed by sonication.

According to one embodiment, a symmetric supercapacitor device comprising $MnO_2$ coated electrodes and a solid state ionic liquid as electrolyte is provided. Preferably, the $MnO_2$ is an aqueous $MnO_2$ obtained by the method as described above. The solid state ionic liquid can comprise one or more imidazolium ionic liquids, and the electrolyte can provide at least one cation selected from: 1-ethyl-3-methylimidazolium (EMIm+), 1-propyl-3-methylimidazolium (PMIm+), 1-butyl-3-methylimidazolium (BMIm+), and at least one anion selected from: chloridion (Cl–), hexafluorophosphate ion (PF6–), bis(trifluoromethylsulfonyl)imide ion(TFSI–).

The electrolyte of the symmetric supercapacitor device can, for example, comprise of 1-n-ethyl-3-methylimidazolium chloride, 1-n-propyl-3-methylimidazolium chloride, 1-butyl-3-methylimidazolium chloride and 1-butyl-3-methylimidazolium hexafluorophosphate. Alternatively, the electrolyte can comprise 1-butyl-3-methylimidazolium hexafluorophosphate, 1-Ethyl-3-methylimidazolium chloride and 1-Butyl-3-methylimidazolium hexafluorophosphate. The solid state ionic liquid of the symmetric supercapacitor device may further comprises inorganic nanoparticles.

According to another embodiment, the invention pertains to an interdigital transparent SC (IT-SC) device comprising aqueous $MnO_2$ ink, for example, provided as $MnO_2$-coated ITO/PET sheets.

Other aspects and advantages of the disclosure will become apparent from the following detailed description when considered in conjunction with the accompanying drawings.

DETAILED DESCRIPTION

1. Method of Synthesis of MnO$_2$ Ink

In an aspect of the present disclosure there is provided an improved method for preparing MnO$_2$ ink with improved efficiency and cost effectiveness as compared to known methods. The present method involves firstly preparing highly crystalline carbon particles (HCCPs) as described in Qian et al. Angew. Chem. Int. Ed., 54(23):6800-6803 (2015). However, in contrast to the prior art, the present method allows the synthesis of MnO$_2$ ink in a shorter amount of time, with an improved yield which is surprisingly found to be as high as 90-95%.

1.1 the Synthesis of Carbon Precursors:

Highly crystalline carbon particles (HCCPs) with diameters can be obtained by allowing 10-15 wt % glucose solution to be irradiated by a microwave system (e.g. CEM Discover SP) is described in Qian et al. Differing from carbon particles that are in amorphous phase high crystallinity. HCCPs can be characterized by having an average diameter under 800 nm and a low $I_D/I_G$ ratio (preferably under 0.8, preferably under 0.6, and more preferably under 0.6) as measured using a micro laser Raman spectrometer (DX2, Thermo, λ=532 nm). Differing from carbon particles that are in amorphous phase, HCCPs demonstrate high crystallinity. Raman spectrum shows the G band and D band of HCCPs. The D band corresponds to the vibrations of carbon atoms with dangling bonds in plane terminations of disordered graphite. The G band corresponds to the $E_{2g}$ mode of graphite layer. See Dresselhaus, et al. Analytical Application of Raman Spectroscopy, (Eds.: M. Pelletier), Blackwell Science, Oxford, 1999, pp. 367-434.

In the preparation of HCCPs according to the present method, the glucose solution is maintained under high pressure and heated. Preferably, the glucose solution is maintained under high pressure of at least 180 psi, and preferably in the range of 200-450 psi, more preferably 250-400 psi, and most preferably 325-375 psi and being heated to at least 150° C., and preferably at least 200° C., more preferably at least 250° C. for approximately 3-25 min, preferably 5-15 minutes, more preferably 5-12 minutes, or until the reaction is considered to complete upon visual examination. When the reaction is completed, the suspension can be subjected to filtration. The HCCPs residues can be re-dissolved into water and sonicated to obtain a HCCPs suspension.

Figure 2B:
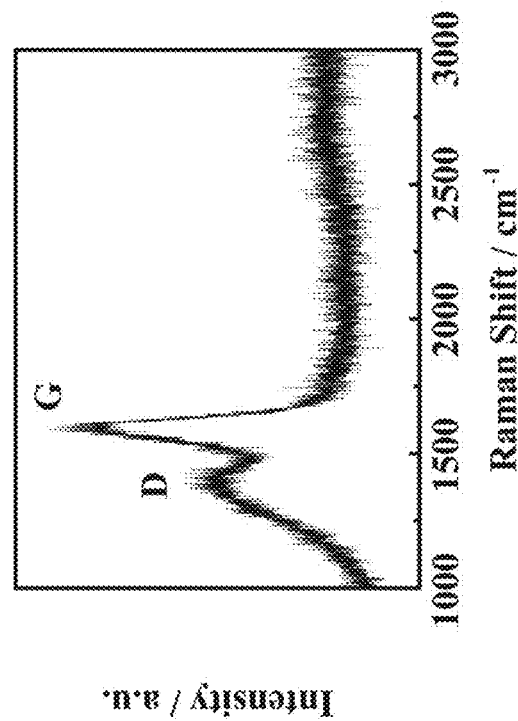
FIG. 2B depicts the Raman spectrum of the prepared highly crystalline carbon particles (HCCPs) of approximately 120-500 nm in average diameter prepared according to the method of the present disclosure.
Figure 2A:
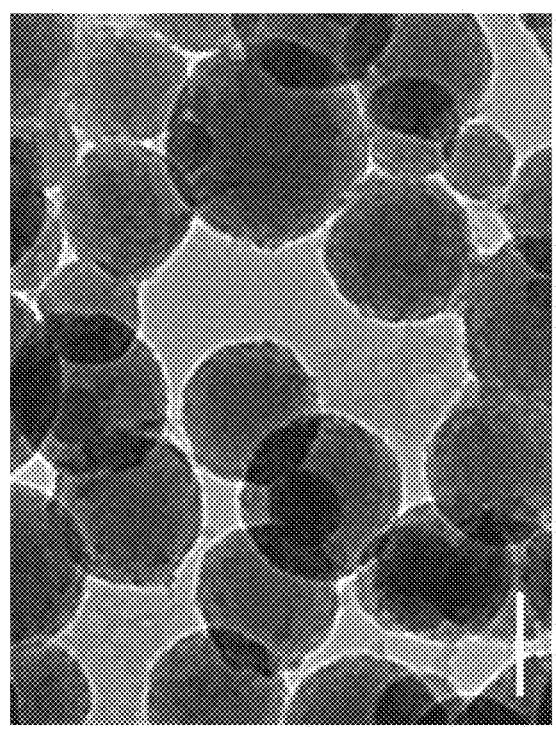
FIG. 2A depicts the TEM image of the prepared highly crystalline carbon particles (HCCPs) of approximately 120-500 nm in average diameter prepared according to the method of the present disclosure. Scale bar is 100 nm.

The average diameters of the obtained HCCPs are preferably under 800 nm, preferably in the range of 120-500 nm, more preferably in the range of 200-400 nm, and most preferably in the range of 200-300 nm. As shown in FIG. 2A, highly crystalline carbon particles (HCCPs) of approximately 120 nm in average diameter, similar to those described in Qian et al., are obtained.

1.2 The Synthesis of MnO$_2$ Ink:

Following the preparation of HCCPs, KMnO4 solution can be added into the HCCPs suspension dropwise under continuous stirring at 30-60° C., and preferably 35-55° C., and most preferably at 40-45° C. for at least 8 hours, and preferably within 8-16 hours, more preferably within 8-12 hours, and most preferably within 8-10 hours. The mass ratio of KMnO$_4$ and HCCPs is about 8:1, and the reaction should proceed as follows:

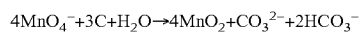

$$4MnO_4^- + 3C + H_2O \rightarrow 4MnO_2 + CO_3^{2-} + 2HCO_3^-$$

When the reaction is completed, the resultant suspension can be further heated to 60-90° C., and preferably 65-85° C., and most preferably 70-80° C. for 30-60 minutes. After cooling to room temperature, the suspension can be filtered, e.g. by using filter paper (pore size: 15-20 μm) to remove the excess reactants. It is anticipated that at least 0.4 mg·mL$^1$ MnO$_2$ ink can be obtained if 14-18 mg·mL−1 KMnO4 solution.

1.3 The Concentration Process of MnO$_2$ Ink:

Optionally, the obtained MnO$_2$ ink can be subjected to further concentration processes. Pure ethanol can be added to the MnO$_2$ ink until precipitates are observed by naked eyes (the volume ratio of ethanol and the ink can be about 1-2:1). After the appearance of precipitation, the MnO$_2$ suspension can be centrifuged, e.g. at 4000 rpm, followed by vacuum filtration by using filter membrane (e.g., pore size: 220 nm) to collect the MnO$_2$ precipitation. Then, the MnO$_2$ precipitation can be re-dissolved into different amount of DI water by sonication (500 W) to prepare different concentration of the ink as required.

Figure 1:
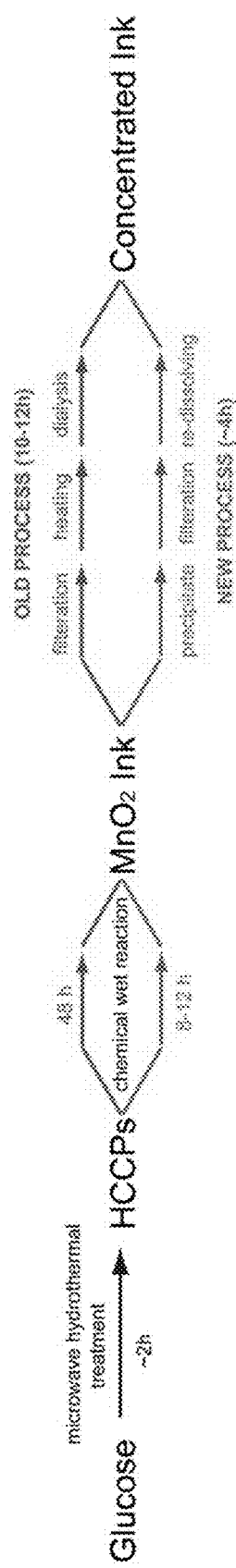
FIG. 1 is a schematic representation comparing the method of the present disclosure with the method in the prior art in the preparation of aqueous $MnO_2$ ink.

The above preparation steps are illustrated in FIG. 1. It is envisaged that one or more steps can be carried out independently as appropriate by a person skilled in the art, and the method is not limited to the process steps as described above.

Figure 3A:
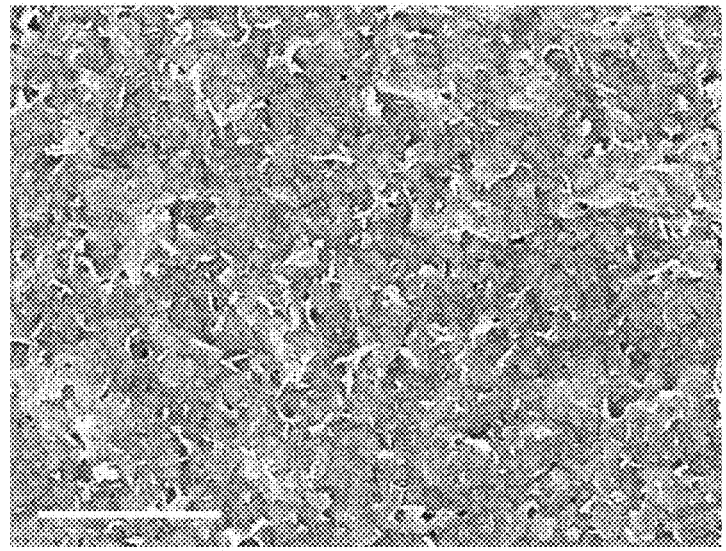
FIG. 3A provides a surface view of the SEM image of the hexagonal MnO$_2$ nanosheets (h-MnNSs) prepared according to the method of the present disclosure. The h-MnNSs were coated on silica wafer for measurement. Scale bar is 500 nm.
Figure 3B:
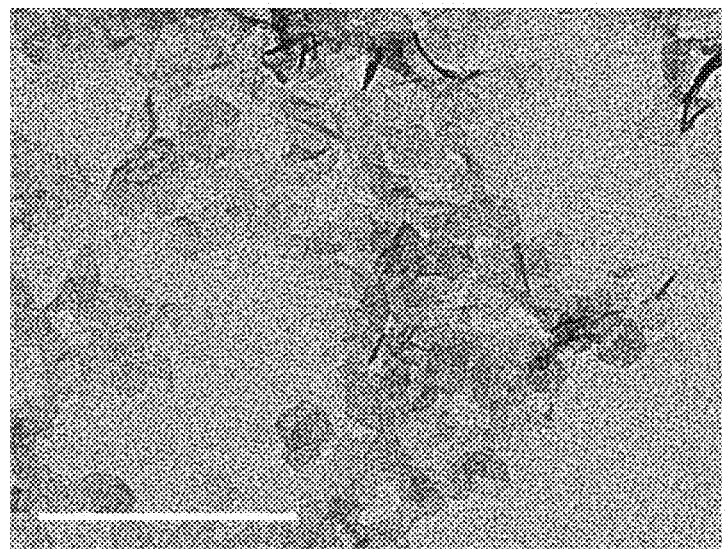
FIG. 3B provides a surface view of the TEM image of the hexagonal MnO$_2$ nanosheets (h-MnNSs) prepared according to the method of the present disclosure. Scale bar is 100 nm.
Figure 3C:
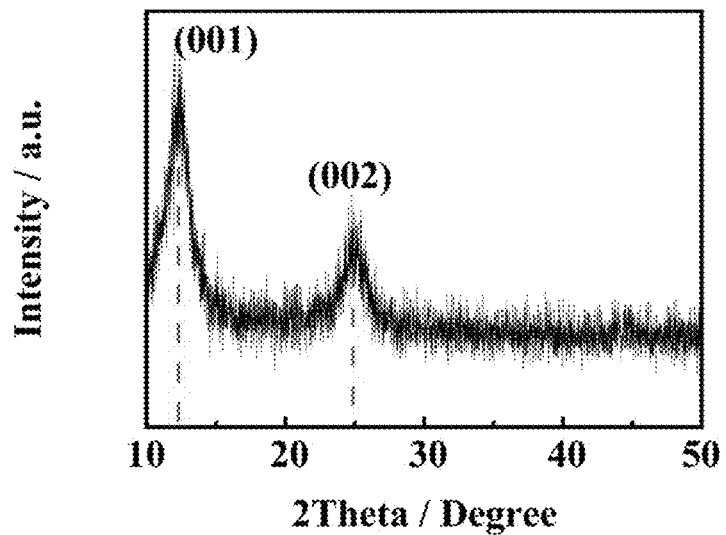
FIG. 3C demonstrates the XRD pattern of the hexagonal MnO$_2$ nanosheets (h-MnNSs) prepared according to the method of the present disclosure.
Figure 3D:
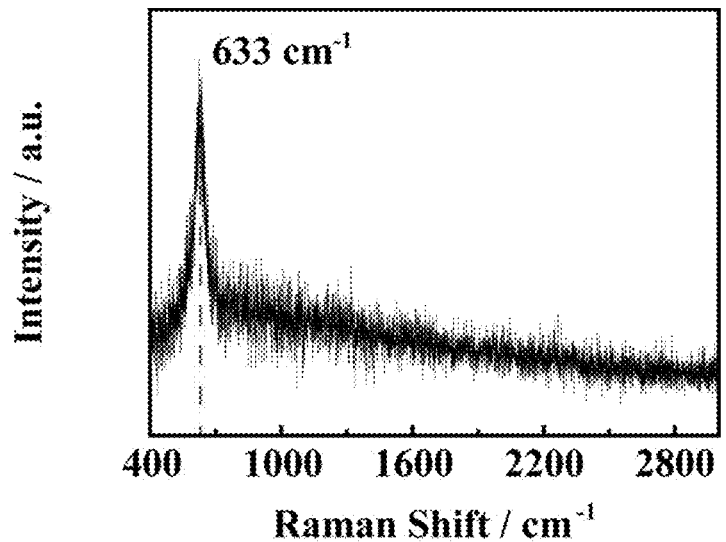
FIG. 3D demonstrates the Raman spectrum of the hexagonal MnO$_2$ nanosheets (h-MnNSs) prepared according to the method of the present disclosure.

Using images obtained from transmission electron microscope (TEM) as shown in FIG. 3B, it is confirmed that $MnO_2$ nanosheets with hexagonal shapes (h-MnNSs) with diameters ranging from 20 to 90 nm are obtained using this method. The characteristics and morphology of the h-MnNSs are similar to those described in Qian J, et al.

Based upon mass balance calculations, it can be understood that when 80 mg of $KMnO_4$ is used as the reactant, the theoretical yield is determined as about 44 mg $MnO_2$. With the present method, it was found that an experimental yield of 40-42 mg can be obtained. Yet, $MnO_2$ synthesis method known in the art (Qian J, et al) obtained a yield of only about 36 mg of the product.

Additionally, whilst the method of Qian et al. required over 48 hours, the preparation time by relying on the present method can be reduced to 8-16 hours using the process steps as described above. Concentrated ink can also be obtained in more efficient manner as shown in FIG. 1. As mentioned, an increased yield of approximately 10% from 80-85% to 90-95% was observed. Comparison of the time and yield of the method of a method of the present disclosure and the method of the prior art is set out in Table 1 below.

TABLE 1

| $MnO_2$ ink | Optimized Method | Prior Art Method |
| --- | --- | --- |
| Average Diameter/nm | 20-90 | 60-90 |
| Preparation period/hours | 8-16 | Above 48 |
| Yield/% | 90-95 | 80-85 |

2. $MnO_2$ Based Symmetric Supercapacitor (SSC)

In another embodiment, an improved $MnO_2$ based symmetric supercapacitor (SSC) is described. Preferably, the $MnO_2$ based SSC comprises an organic electrolyte gel and $MnO_2$ electrode, e.g. carbon fibre cloth or other suitable substrate deposited with $MnO_2$ ink, such as the ink obtained using the method described above, to provide maximised electrochemical performance.

In this embodiment of the disclosure, an organic electrolyte (such as an ionic liquid) replaces the polyvinyl alcohol (PVA)/LiCl electrolyte described in the prior art. It has been found that the present novel electrolyte system significantly extends the potential window and improves the energy density of the SSC device as illustrated by the experimental data presented below.

For the fabrication of SSC, two identical $MnO_2$ electrodes are assembled for the symmetric capacitor configuration. An organic electrolyte, e.g. comprising one or more imidazolium ionic liquids can be used as the electrolyte. The electrolyte system may comprise only one imidazolium ionic liquid, or may be formulated to include two, three, four, or more imidazolium ionic liquids.

The selected ionic liquids are mixed with inorganic nanoparticles with a particle diameter of 1-100 nm, such as nano-magnesium oxide, nano-alumina or nano-silica, (e.g., at room temperature under continuous stirring) to form a solid state ionic liquid. The optimal ratio of ionic liquid and silica can be determined by a person skilled in the art, and is optionally within the range of 1:0.03-0.1 (liquid:silica). Any commercially available inorganic nanoparticles may be used. Preferably, silica nanoparticles are selected.

It is known to persons skilled in the art that ionic liquid is comprised of one cation and one anion. In a preferred embodiment, one or more imidazolium ionic liquids can be included in the SSC to provide at least one cation selected from: 1-ethyl-3-methylimidazolium (EMIm$^+$), 1-propyl-3-methylimidazolium (PMIm$^+$), 1-butyl-3-methylimidazolium (BMIm$^+$), and at least one anion selected from: chloridion (Cl$^-$), hexafluorophosphate ion (PF$_6^-$), bis (trifluoromethylsulfonyl)imide ion(TFSI$^-$). Useful ionic liquids comprising one of the cations and one of the anions as mentioned below, include: EMImCl, EMImPF$_6$, BMImPF$_6$, EMImTFSI, PMImCl, etc.

In an exemplary embodiment, 1-ethyl-3-methylimidazolium hexafluorophosphate, 1-ethyl-3-methylimidazolium chloride and 1-butyl-3-methylimidazolium hexafluorophosphate are provided as the electrolyte of the SSC in a mass ratio of (0.5-2.0):(0.3-2.0):(0.3-2.0), and more preferably (0.9-1.15):(0.9-1.15):(0.9-1.15). As an example, an electrolyte comprising 1-ethyl-3-methylimidazolium hexafluorophosphate, 1-ethyl-3-methylimidazolium chloride and 1-butyl-3-methylimidazolium hexafluorophosphate with a mass ratio of (1):(1):(1) is provided.

In another exemplary embodiment, 1-n-ethyl-3-methylimidazolium chloride, 1-n-propyl-3-methylimidazolium chloride, 1-butyl-3-methylimidazolium chloride and 1-butyl-3-methylimidazolium hexafluorophosphate may be used in combination with a mass ratio of (0.9-1.15):(0.9-1.15): (0.9-1.15):(12-28).

The $MnO_2$ based SSC may include additional ionic liquids not limited to imidazolium ionic liquids, or other known organic or inorganic electrolytes, which can be liquid or gel, such as, liquid organic electrolytes, or liquid inorganic electrolytes, week or strong electrolytes, and one or more electrolyte additives.

As illustrated in the examples (FIG. 4), the CV curve of the SIL-$MnO_2$-SSC comprising ionic liquids at 1000 mV·s$^1$ exhibits an apparent improvement in specific capacitance and rate capability as compared with the $MnO_2$ aqueous gel-ASSC. The calculated specific capacitance of the SIL-$MnO_2$-SSC at 1000 mV·s$^{-1}$ is 228 F·g$^{-1}$.

Figure 5B:
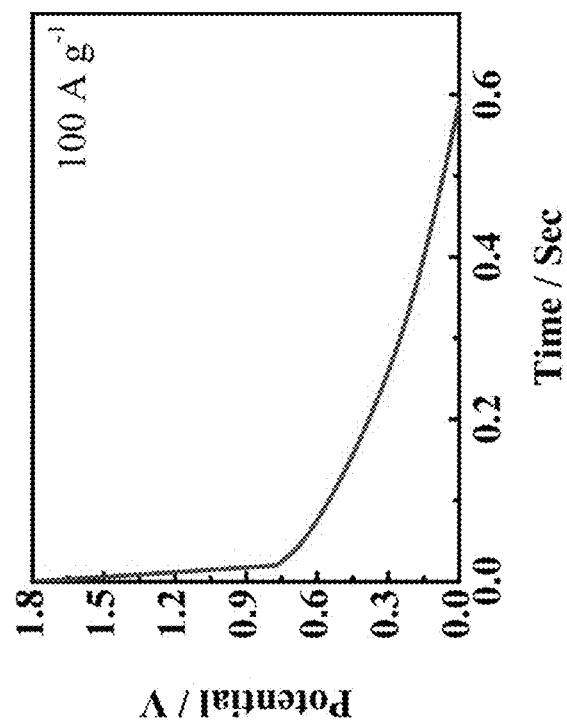
FIG. 5B shows the discharging curves of SIL-MnO$_2$-SSC at 100 A·g$^{-1}$.
Figure 5A:
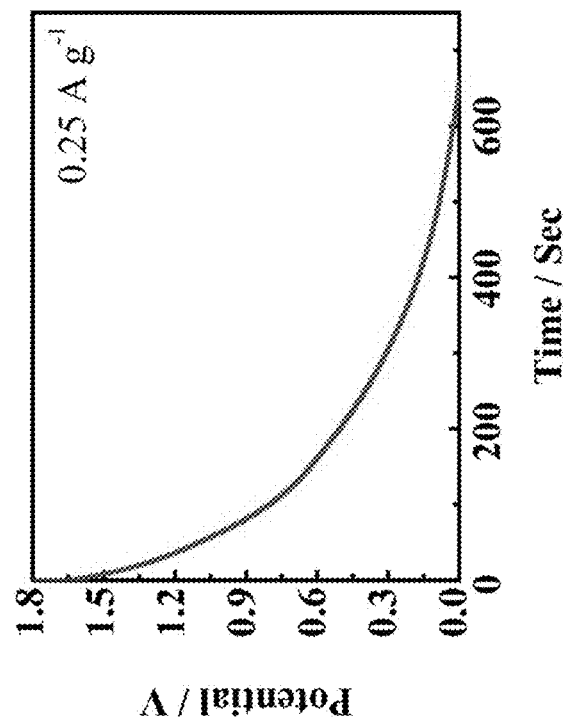
FIG. 5A shows the discharging curves of SIL-MnO$_2$-SSC at 0.25 A·g$^{-1}$.
Figure 6:
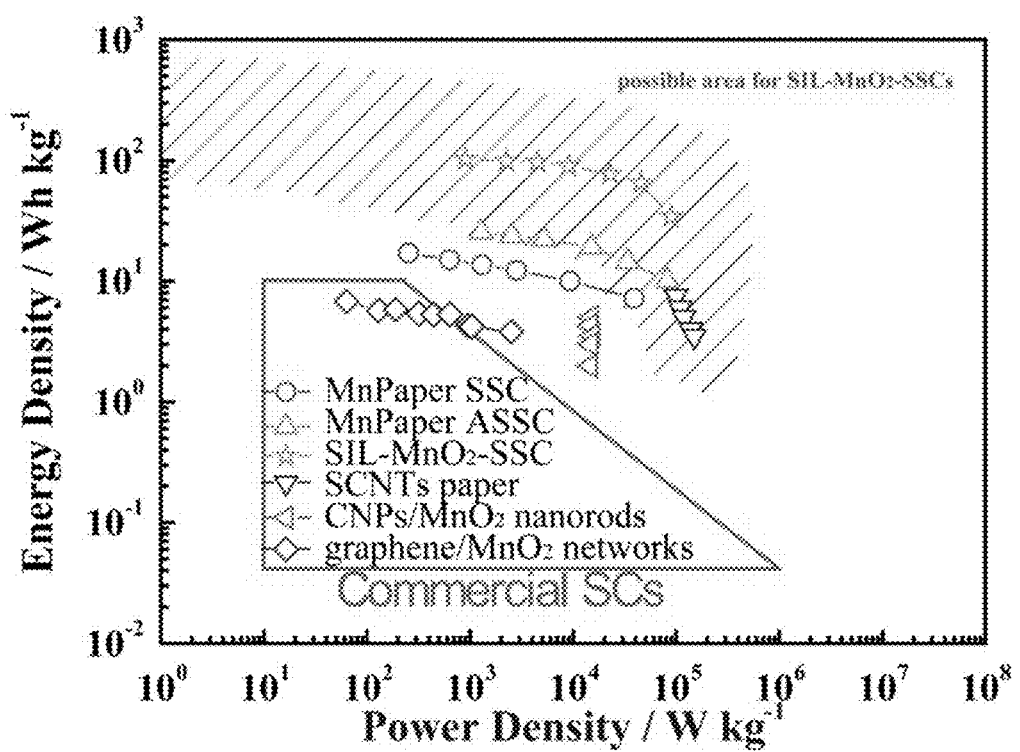
FIG. 6 exhibits the Ragone plots of the SIL-MnO$_2$-SSC and devices in the prior art, demonstrating the surprising, significantly improved electrochemical performance of the SIL-MnO$_2$I-SSC.

As shown in FIG. 5, the discharging curves of the SIL-$MnO_2$-SSC at 0.25 and 100 A·g$^{-1}$ exhibit sloping lines from 1.8 to 0V. The IR drop are estimated to be 0.13 and 1.03 V at 0.25 and 100 A·g$^{-1}$ respectively. The energy and power densities are estimated to be 98.8 Wh·kg$^{-1}$ and 225 W·kg$^{-1}$ at 0.25 A·g$^{-1}$, while the values are estimated to be 34 Wh·kg$^{-1}$ and 90000 W·kg$^{-1}$ at 100 A·g$^{-1}$. As illustrated in FIG. 6, the Ragone plots for a comprehensive comparison of energy and power densities between the SIL-$MnO_2$-SSC (formed on carbon fiber cloth) and other recent reported devices in the literature. It is apparent that the possible area of the energy and power densities of SIL-$MnO_2$-SSC is significantly higher than those of the Single-walled carbon nanotubes (SCNTs) paper, graphene/$MnO_2$ networks, Carbon nanoparticles (CNPs)/$MnO_2$ nanorods and MnPaper devices. The maximum energy and power densities of the SIL-$MnO_2$-SSC are expected to reach 103 Wh·kg$^{-1}$ and 90 kW·kg$^{-1}$, indicating the large number of potential application of the SSC.

Using the solid state ionic liquid as the electrolyte of the symmetric capacitor, the output voltage and energy density of the supercapacitors are respectively the same and 400% higher than the asymmetric devices reported in in the prior art. It is theorized that the improved electrochemical performance of the new device could be attributed to the better interaction between the electrolyte and the electrode prepared by the new method. According to the previous report, the penetration depth of the new electrolyte into the new electrode could be deeper than that of the old electrode (Langmuir, 2009, 25, 11955), leading to a higher specific capacitance and energy density.

3. Interdigital Transparent SC (IT-SC) Device

Another embodiment of the present disclosure relates to the fabrication of the interdigital transparent SC (IT-SC) device, containing $MnO_2$ ink, such as but is not limited to the ink obtained using the method described above.

The fabrication of the interdigital transparent SC (IT-SC) device is exemplified in FIG. 7. As shown in FIG. 7A, $MnO_2$-coated ITO/PET sheets show minimal color changes after coating with $MnO_2$. FIG. 7B shows a bent SC device, indicating that the IT-SC device is highly flexible and therefore has the potential for a large number of applications, such as the use in personal products, or medical devices, e.g. in the electronic skins, human-machine interface or mobile devices.

Figure 7B:
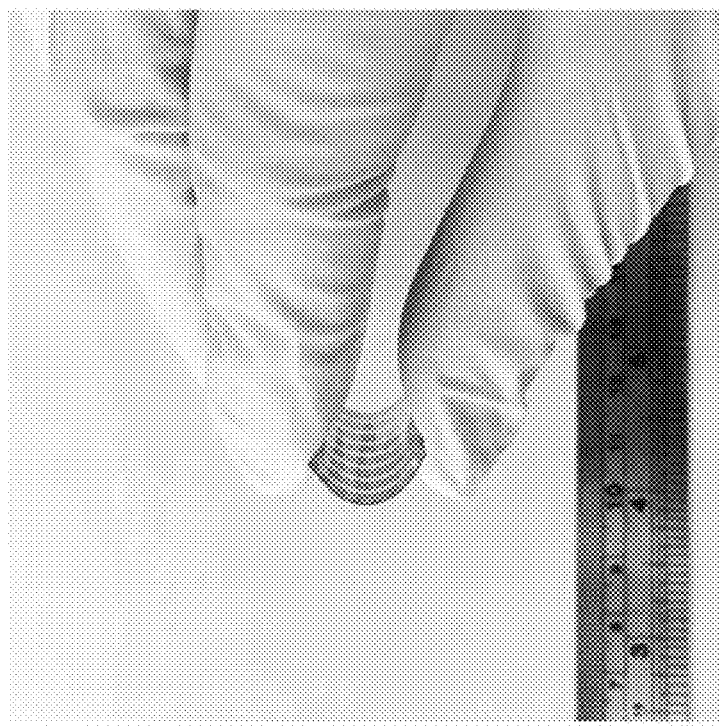
FIG. 7B depicts a photograph of a bent interdigital transparent SC (IT-SC) device together with a ruler for scale.
Figure 7A:
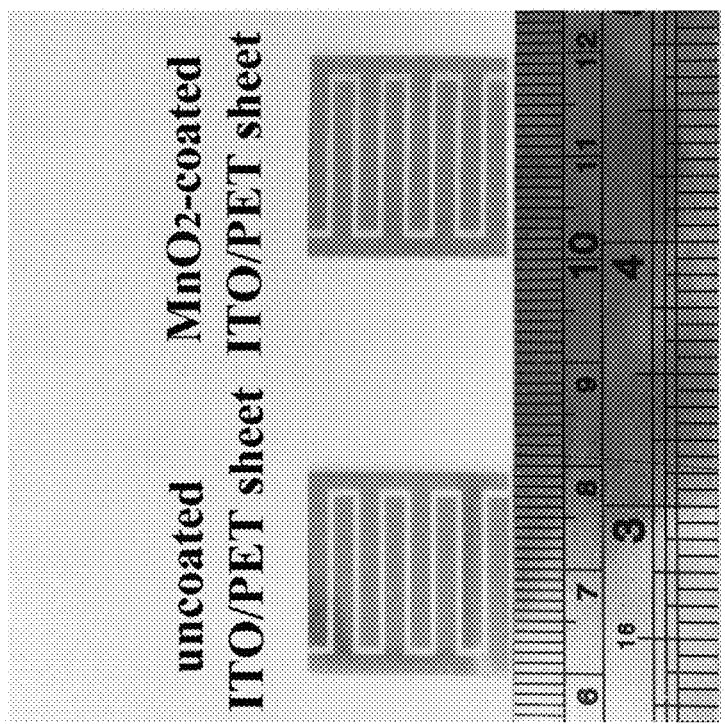
FIG. 7A is an image of an uncoated and MnO$_2$-coated ITO/PET sheet of the interdigital transparent SC (IT-SC) device together with a ruler for scale.
Figure 7D:
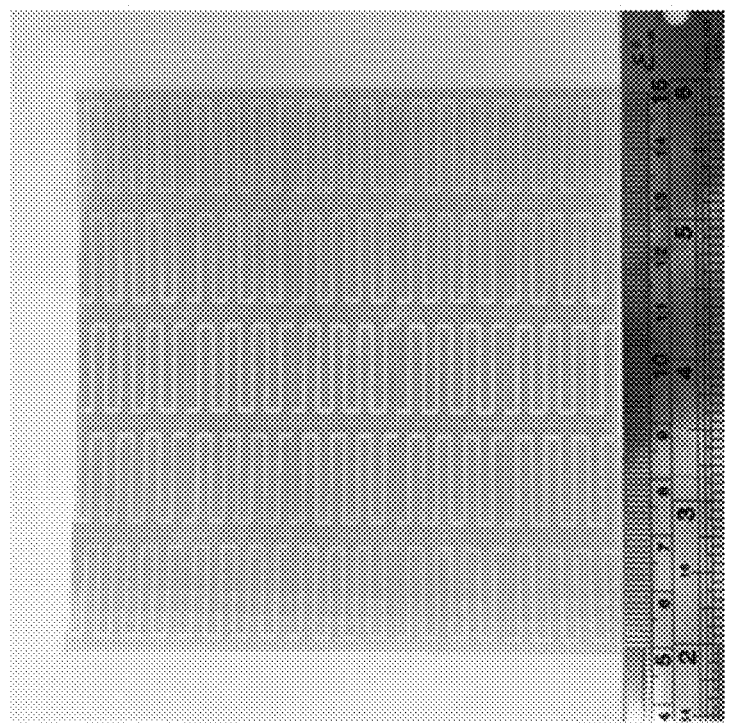
FIG. 7D is an image depicting a large scale production of 25 single IT-SC devices on one sheet together with a ruler for scale.
Figure 7C:
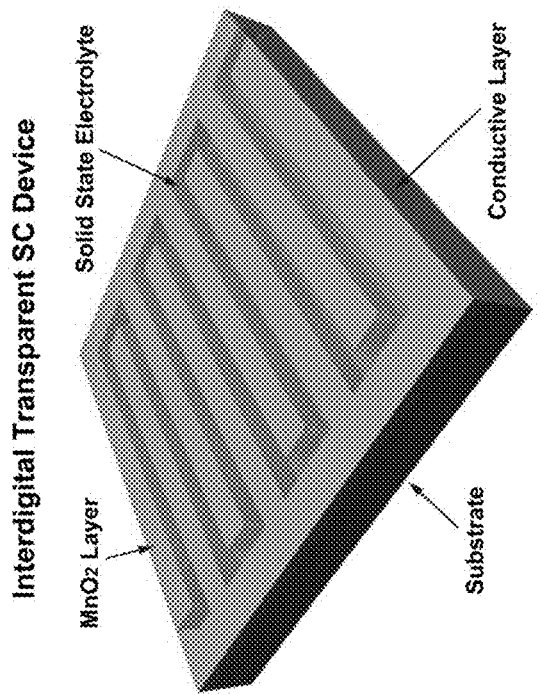
FIG. 7C is a schematic illustration of the interdigital transparent SC device together with a ruler for scale.
Figure 7E:
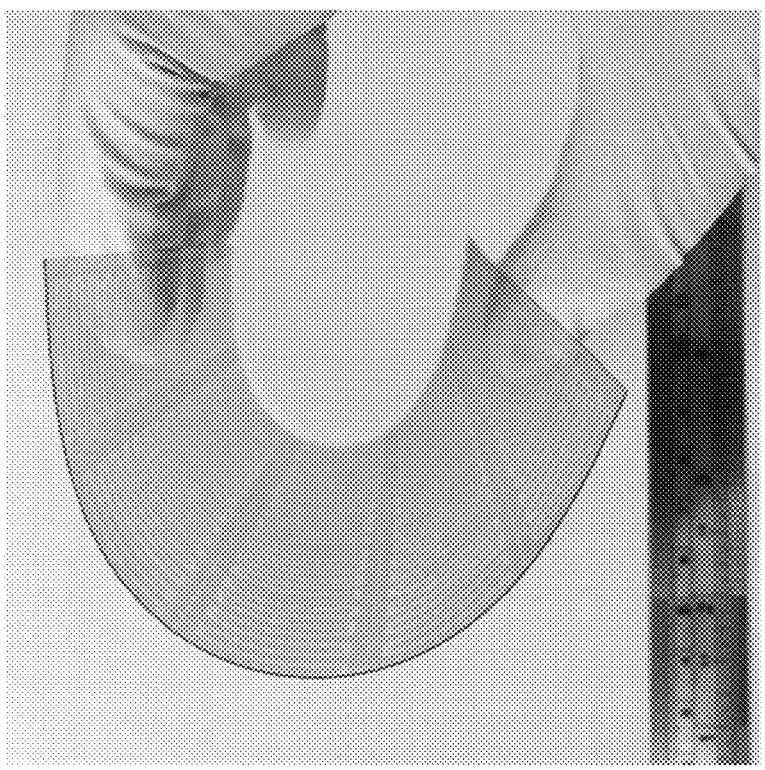
FIG. 7E shows a photograph of the bent sheet of FIG. 7D together with a ruler for scale.

Aqueous $MnO_2$ ink can be coated on the ITO/PET sheet by using inkjet printing system that facilitates large scale production, as shown in FIGS. 7D and 7E. Specifically, FIG. 7D demonstrates that, in scaled-up production, 25 single IT-SC devices with high flexibility could be fabricated on a single sheet at one time, indicating a potential for mass production. FIG. 7E further shows a photograph of the bent sheet containing 25 IT-SC devices.

These figures illustrate the potential application of the $MnO_2$ ink for highly flexible semi-transparent SC. The characteristics as displayed are highly desirable due to their potential in commercial applications. There is currently an unmet demand for SC devices have such characteristics. The solid state ionic liquid is expected to contribute to the high performance of IT-SC.

EXAMPLES

The present disclosure will be further illustrated by the following illustrative embodiments.

Example 1

Preparation of $MnO_2$ Ink and Characterization

A glass tube filled with 10 wt % glucose solution was irradiated with a microwave system as described in L. Tang et al. (ACS Nano 2012, 6, 5102-5110) at 350 psi and 250° C. for 5 min, to form a suspension containing highly crystalline carbon particles (HCCPs). The suspension was poured out for filtration. The HCCPs residues were re-dissolved into water and sonicated to form a 0.1 $mg \cdot mL^{-1}$ HCCPs suspension. Subsequently, 16 $mg \cdot mL^{-1}$ $KMnO_4$ solution was added into the HCCPs suspension dropwise under continuous stirring and maintained at 45° C. for 9 h. The resultant suspension was then heated to 75° C. under stirring for 1 h. After cooling to room temperature, the suspension was filtered by using filter paper (pore size: 15-20 μm) to remove the excess reactants to obtain a $MnO_2$ ink. Pure ethanol was added to the as-obtained $MnO_2$ ink until precipitates were observed. The $MnO_2$ suspension was centrifuged at 4000 rpm, followed by vacuum filtration using filter membrane (pore size: 220 μm) to collect a $MnO_2$ precipitation. The $MnO_2$ precipitation was re-dissolved into 40 mL of DI water to prepare ~1 $mg \cdot mL^{-1}$ ink.

The microstructure and morphology of HCCPs and $MnO_2$ ink were characterized by scanning electron microscope (SEM) (Hitachi S-4800) and/or transmission electron microscope (TEM) (JEM 2100F).

The obtained HCCPs are shown to be approximately 120 nm in average diameter as shown in FIG. 2A. As demonstrated by the Raman spectrum of the HCCPs (FIG. 2B), the intensity ratio of D peak and G peak ($I_D/I_G$) of the HCCPs was calculated as ~0.6, indicating a high graphitization level. It is known in the art that the intensity ratio of D peak and G peak ($I_D/I_G$) can be relied upon to indicate the graphitization level of the materials. A high graphitization level is indicated if the value of $I_D/I_G$ is <0.8.

Characterisation of the obtained $MnO_2$ ink using SEM is as shown in FIG. 3A ($MnO_2$ coated on silica wafer for measurement). Further experiments show that $MnO_2$ ink obtained using the above method is highly versatile as it was shown to be possible to print the ink onto different substrates, including silica wafer, paper, glass, plastic or stainless steel, to form continuous thin films. It was also shown that the $MnO_2$ ink can be etched by oxalic acid (results not shown).

Transmission electron microscopy (TEM) image as shown in FIG. 3B confirmed that $MnO_2$ nanosheets with hexagonal shapes (also referred as "h-MnNSs") with diameters ranging from 20 to 50 nm are obtained.

As shown in Table 1, the present method allows the synthesis of $MnO_2$ ink in a much shorter time, and the yield is found to be unexpectedly high (~91%), as compared to the yield obtained using known methods.

Example 2

Examination of Electrochemical Performance of $MnO_2$ Symmetric Supercapacitor with Ionic Liquids ("CE" represents Comparative Experimental Example)
Preparation of SCNTs Paper ("CE-A")

As a first step, an ink is formed by allowing CNTs grown by laser ablation and sodium dodecylbenzenesulfonate (SDBS, Sigma-Aldrich) to be dispersed in deionized water. Their concentrations were 10 and 1-5 mg/mL, respectively. After bath sonication for 5 min, the CNT dispersion was probe-sonicated for 30 min at 200 W (VC 505; Sonics) to form an ink. Meyer rods (Rdspecialties) were used to coat the CNT ink onto Xerox paper. Subsequently, conductive paper is prepared as follows. For Meyer rod coating of CNT films, CNT ink was dropped onto the paper surface. Then, the rod was rolled to the other end of the paper (Xerox). The thickness of the dried CNT film could be controlled by the ink concentration and the wire size of the Meyer rods.
Preparation of Graphene/$MnO_2$ Composite ("CE-B")

Ni foam was used to catalyze the graphene growth to obtain 3D graphene networks. First, Ni foam (100 pores per inch, 380 $g/m^2$ surface density, and ~1.5 mm thick, purchased from Changsha Lyrun New Material Co. Ltd., China), cut into pieces of 1 cm×2 cm, was pressed into a thin sheet ~0.2 mm thick. After being cleaned in 1M HCl solution for 10 min and in acetone and deionized water for 15 min, respectively, the pressed nickel foam was prepared to grow graphene. Second, a typical growth process was as follows: (1) The standard 1.5 inch quartz tube was heated in a furnace up to 1000° C. under Ar gas flow; (2) nickel foam was introduced into the hot-zone of the furnace by moving the quartz tube under the $H_2$ (50 sccm) and Ar (280 sccm) gas flows and annealed for 20 min to clean their surfaces and eliminate a thin surface oxide layer; then a small amount of $CH_4$ (2.5 sccm) was introduced into the reaction tube under atmospheric pressure for 5 min growth; (3) the nickel foam was quickly cooled to 400° C. at a cooling rate of >300° C./min under a $H_2$/Ar atmosphere by quickly removing it from the hot-zone of the furnace. Third, the Ni foams covered with graphene were drop-coated with a poly(methyl methacrylate) (PMMA) solution (4.5% in anisole) and then baked at 160° C. for 0.5 h. The PMMA/graphene/Ni foam structure was obtained after solidification. Fourth, these samples were put into a 6M HCl solution for 6 hours to completely dissolve the Ni foam to obtain the PMMA/graphene. Finally, three-dimensional graphene networks were obtained after removing PMMA in hot acetone at 40° C.

Avoiding damaging the structure of 3D graphene networks, copper wires were embedded and connected to 3D graphene networks with silver paste, which enables a strong electrical contact and a small contact resistance between the copper wires and the 3D graphene networks. A piece of 1 cm×1 cm 3D graphene network was immersed into a 20 mM $Mn(NO_3)_2$ and 100 mM $NaNO_3$ mixed aqueous solution. Electrochemical deposition of $MnO_2$ nanomaterials was performed with a three-electrode setup, where the conductive 3D graphene network was used as the working electrode, a platinum electrode as the counter electrode, and a Ag/AgCl electrode as the reference electrode. A square-wave pulse current of 500 µA/cm$^2$ with a period of 0.002 s and a duty ratio of 0.5 was applied to ensure the conformal coating of nanostructured $MnO_2$ on the 3D graphene networks. After electrodeposition, the composite was taken out and carefully washed with deionized water to remove excess electrolyte and then dried in a vacuum oven at 50° C. for 2 hours. Finally, the composite was annealed under an Ar atmosphere at 300° C. to form crystalline $MnO_2$. The mass of deposited $MnO_2$ nanomaterials was obtained by the weight difference of the networks before coating and after post-annealing.

Preparation of Carbon Nanoparticles (CNPs)/$MnO_2$ Nanorods ("CE-C")

Strips of carbon fabric were located in the flame center for 30 s, then moved away, and CNPs grew on the side facing the ethanol flame. Then anodic electrodeposition of $MnO_2$ was performed at a constant current of 0.5 mA/cm$^2$ in a solution of 0.01M manganese acetate ($MnAc_2$) and 0.02M ammonium acetate ($NH_4Ac$) containing 10% dimethyl sulfoxide (DMSO) at 70° C. Before the electrodeposition process, ethanol or 2-propanol was dropped onto the carbon fabric to make it hydrophilic. The deposition process continued for 1 to 45 min, and then the carbon fabric was taken out and washed with deionized water thoroughly.

Preparation of SSC & ASSC

For the fabrication of symmetric capacitor (SSC), two identical electrodes were assembled for the symmetric capacitor configuration.

To prepare SIL-$MnO_2$-SSC ("SIL" represents Solid Ionic Liquid), $MnO_2$ electrode was prepared using carbon fibre cloth (CFC) as a substrate. As a first step, carbon fibre cloth (CFC) was washed with DI water and ethanol for several times. Then 1 mg·mL$^{-1}$ $MnO_2$ ink was deposited on the CFC at 60-80° C. For the electrochemical measurements, a 1.5×1 cm $MnO_2$ electrode was applied. To reduce the resistance between alligator clip and electrode, 0.5×1 cm of $MnO_2$ electrode was erased by 1 mol·L$^1$ oxalic acid solution to remove the $MnO_2$ and then coated by silver paint.

Subsequently, ionic liquids of $EMImPF_6$, EMImCI and $BMImPF_6$ in a mass ratio of 1:1:1 were mixed with silica nanoparticles (1:0.03-0.1) at room temperature under continuous stirring to form the solid state ionic liquid. Silica nanoparticles with size of ~100 nm were purchased from MTI. Corp. Two $MnO_2$ electrodes with same weights of active materials were immersed into ionic liquid gel for 5 min, and then sandwiched with a separator (NKK TF40, 40 µm) in between. The device was clamped tightly (to decrease the contact resistance between electrodes) to narrow the space between two electrodes and dried in an oven at 40° C. for 12 h.

To prepare the comparative example PVA/LiCl gel SSC (also referred as "MnPaper SSC"; "CE-D"), $MnO_2$ conductive paper electrode was prepared by pre-treating commercial A4 paper (Double A) by multi-walled carbon nanotubes (MCNTs, commercial product) with a mass loading of 0.8 mg·cm−2 to form the conductive paper firstly. Then 1 mg·mL−1 $MnO_2$ ink was deposited with aid of surfactant (sodium dodecylbenzenesulfonate, SDBS) on as-prepared conductive paper by 80 µg·cm$^{-2}$ and then washed thoroughly by DI water to remove the surfactant.

In this comparative example PVA/LiCl gel was used as the electrolyte. The LiCl/PVA gel was prepared by mixing 12.5 g LiCl, 6 g PVA and 60 mL DI water. The whole mixture was heated to 85° C. under stirring until the solution became clear. Two MnPaper electrodes with same weights of active materials were immersed into LiCl/PVA gel for 5 min, and then sandwiched with a separator (commercial A4 paper) in between. The device was also damped tightly (to decrease the contact resistance between electrodes) to narrow the space between two electrodes and dried in an oven at 40° C. for 12 h.

For the fabrication of coaxial asymmetric capacitor (also referred as "Aqueous gel-ASSC" or "MnPaper ASSC"; "CE-E"), functionalized carbon fibers (FCFs) were prepared firstly. The FCFs were applied a potential of 2.2 V for 10 min in 1 mol·L$^{-1}$ $H_2SO_4$ in a three-electrode system with a FCF as the working electrode, a platinum electrode as the counter electrode and an Ag/AgCl electrode as the reference electrode. After that, the FCFs were annealed in a tube furnace in air atmosphere at 300° C. for 3 hours. Afterwards, one strip of as-prepared MnPaper electrode and one strip of FCFs were immersed into LiCl/PVA aqueous gel for 5 min. The FCFs were wrapped by the separator (NKK TF40, 40 µm) at first, followed by being wrapped by the MnPaper electrode to form the coaxial asymmetric capacitor. Finally, the device was kept in an oven at 40° C. for 12 h. In this arrangement, FCF serves as the anode for aqueous gel-ASSC, with $MnO_2$ coated paper electrode serves as the cathode.

For the asymmetric capacitor, the charge balance follows the relationship: $q^+=q^-$. The charge stored by each electrode depends on the specific capacitance ($C_{sp}$), the potential window for the charge/discharge process ($\Delta V$) and the mass of the electrode (m) following the equation 1:

$$q = C_{sp} \times \Delta V \times m \qquad (1)$$

In order to get $q^+=q^-$, the mass balancing will follow the equation 2:

$$\frac{m_+}{m_-} = \frac{C_{sp,-} \times \Delta V_-}{C_{sp,+} \times \Delta V_+} \qquad (2)$$

Electrochemical Measurements

All the electrochemical experiments were performed at ambient temperature. For the single electrode, a three-electrode system was applied by using $MnO_2$ electrode as the working electrode, platinum electrode as the counter electrode and Ag/AgCl electrode as the reference electrode. For both symmetric and asymmetric capacitors, two-electrode systems were applied by using a solid state ionic liquid or PVA/LiCl quasi-solid state electrolyte. All the cyclic voltammograms (CV), galvanostatic charge-discharge (GCD) and electrochemical impedance spectrum (EIS) measurements were carried out on a CHI 660C electrochemical workstation (CH Instruments). The specific areal and gravimetric capacitance ($C_{sp,M}$, F·g$^{-1}$ and $C_{sp,A}$, F·cm$^{-2}$) were calculated according to the following equations (3, 4):

$$C_{sp,M} = \frac{\Delta Q}{2 \times \Delta V \times m \times r} \quad (3)$$

$$C_{sp,A} = \frac{\Delta Q}{2 \times \Delta V \times S \times r} \quad (4)$$

where $\Delta Q$ is the charge integrated from the whole voltage range; $\Delta V$ is the whole range of voltage window; m is the total mass of active material on the electrodes; S is the total area of active material on the electrodes; r is the scan rate of CV measurement.

The GCD measurements at various current densities were performed. Specific areal and gravimetric capacitance ($C_{sp,M}$ F·g$^{-1}$ and $C_{sp,A}$, F·cm$^{-2}$) of each electrode were calculated according to the equations (5, 6):

$$C_{sp,M} = \frac{I \times \Delta t}{\Delta V \times M} \quad (5)$$

$$C_{sp,A} = \frac{I \times \Delta t}{\Delta V \times S} \quad (6)$$

where I is the discharge current; $\Delta t$ is the discharge time; $\Delta V$ is the voltage difference within the discharge time $\Delta t$; and m is the total mass of active material on the electrodes; S is the total area of active material on the electrodes.

The gravimetric energy density (E, Wh·kg$^{-1}$) and gravimetric power density (P, W·kg$^{-1}$) were calculated according to the equations (7, 8):

$$E = \frac{1}{2} C_{sp} V^2 \quad (7)$$

$$P = \frac{E}{\Delta t} \quad (8)$$

where $C_{sp}$ is the specific gravimetric capacitance of the capacitor; V is the operating voltage window; $\Delta t$ is the discharging time.

Results

Figure 4:
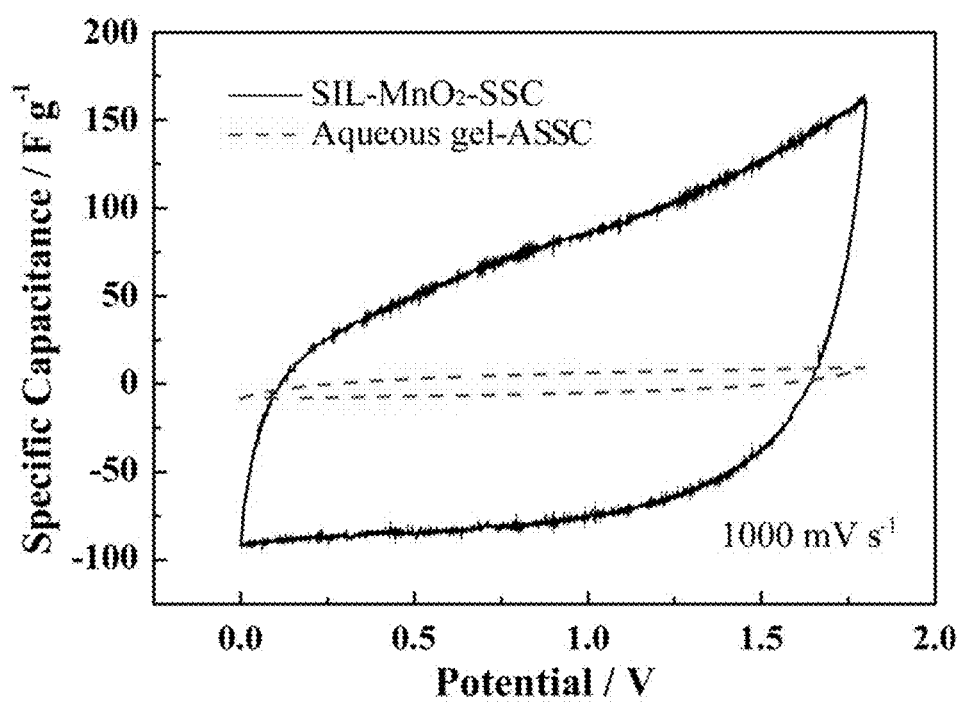
FIG. 4 shows the CV curves of SIL-MnO$_2$-SSC and aqueous gel-ASSC at 1000 mV·s−1. As shown, the SIL-MnO$_2$-SSC achieved much higher specific capacitance than aqueous gel-ASSC at the same scan rate (1000 mV·s$^{-1}$) and output voltage (1.8V).

As Aqueous gel-ASSC (CE-E) is known to be able to reach the highest voltage (1.8V) as compared to other prior art devices, this was chosen for further investigation and comparison with SIL-MnO$_2$-SSC. The cyclic voltammetry (CV) curves of SIL-MnO$_2$-SSC and Aqueous gel-ASSC were plotted and compared as shown in FIG. 4. As demonstrated, SIL-MnO$_2$-SSC was able to achieve a much higher specific capacitance as compared to aqueous gel-ASSC (CE-E) at the same scan rate (1000 mV·s$^{-1}$) and output voltage (1.8V); such superior performance was unexpected and indicate that potential uses of the supercapacitor. The calculated specific capacitance of the SIL-MnO$_2$-SSC at 1000 mV·s$^{-1}$ is 228 F·g$^{-1}$. The display of rectangular-like curve shape indicates high speed ion-transport on electrode/electrolyte interface with rapid charging and discharging characteristics of the SIL-MnO$_2$-SSC.

As shown in FIG. 5, the discharging curves of the SIL-MnO$_2$-SSC at 0.25 and 100 A·g$^{-1}$ exhibit sloping lines from 1.8 to 0V. The IR drop are estimated to be 0.13 and 1.03 V at 0.25 and 100 A·g$^{-1}$ respectively. The energy and power densities are estimated to be 98.8 Wh·kg$^{-1}$ and 225 W·kg$^{-1}$ at 0.25 A·g$^{-1}$, while the values are estimated to be 34 Wh·kg$^{-1}$ and 90000 W·kg$^{-1}$ at 100 A·g$^{-1}$.

Ragone plot (also known as Ragone chart) is a chart often used for performance comparison of various energy-storing devices. To investigate the electrochemical performance of SIL-MnO$_2$-SSC, Ragone plots for a comprehensive comparison of energy and power densities between the SIL-MnO$_2$-SSC and other recent reported devices in the literature are obtained and the results are shown in FIG. 6.

Based on the obtained results, it is apparent to a person skilled in the art that the possible area of the energy and power densities of SIL-MnO$_2$-SSC is much higher than the comparative examples, namely, Single-walled carbon nanotubes (SCNTs) paper, graphene/MnO$_2$ networks, Carbon nanoparticles (CNPs)/MnO$_2$ nanorods and MnPaper devices. The maximum energy and power densities of the SIL-MnO$_2$-SSC are estimated to reach 103 Wh·kg$^{-1}$ and 90 kW·kg$^{-1}$.

A comparison between specific capacitance and energy and power densities of the tested devices are summarized in Table 2 below.

TABLE 2

| Ref. | Materials | Electrolyte | Voltage (V) | $C_{sp}$ (F · g$^{-1}$) | $E_{max}$ (Wh · kg$^{-1}$) | $P_{max}$ (kW · kg$^{-1}$) |
|---|---|---|---|---|---|---|
| CE-A | Single-walled carbon nanotubes | 1M H$_2$SO$_4$ solution | 0.8 | 200 (single electrode) | <10 | ~100 |
| CE-B | Graphene/MnO$_2$ Composite Networks | 0.5M Na$_2$SO$_4$ solution | 1 | 130 | 6.8 | 2.5 |
| CE-C | Carbon nanoparticles/ MnO$_2$ nanorods | PVA/H$_3$PO$_4$ | 0.8 | / | 4.8 | 14 |
| CE-D | MnPaper SSC | PVA/LiCl | 0.8 | 191 | 17 | 38 |
| CE-E | MnPaper ASSC | | 1.8 | 56 | 25.3 | 80 |
| Embodiment | SIL-MnO$_2$-SSC | EMImPF$_6$ + EMImCl + BMImPF$_6$ gel (mass ratio = 1:1:1) | 1.8 | 228 | 103 | 90 |

$C_{sp}$—specific capacitance;
$E_{max}$—maximum energy density;
$P_{max}$—maximum power density.

The specific embodiments described herein are meant to be exemplary only, and various modifications will be apparent to those skilled in the art. The claims below are intended to cover all such modifications that fall within the true spirit and scope of the disclosure.

The invention claimed is:

1. A symmetric supercapacitor device comprising $MnO_2$ coated electrodes and a solid state ionic liquid as electrolyte, wherein the $MnO_2$ is an aqueous $MnO_2$ obtained by:
providing highly crystalline carbon particles (HCCPs) with average diameters less than 800 nm;
mixing $KMnO_4$ solution with the HCCPs at 30-60° C. for at least 8 hours; and
increasing the temperature of the resultant suspension to 60-90° C. for 30-60 minutes, followed by cooling and filtration.

2. The symmetric supercapacitor device according to claim 1, wherein the solid state ionic liquid further comprises inorganic nanoparticles.

3. The symmetric supercapacitor device according to claim 1, wherein the solid state ionic liquid further comprises inorganic nanoparticles.

4. The symmetric supercapacitor device according to claim 1, wherein the solid state ionic liquid comprises one or more imidazolium ionic liquids.

5. The symmetric supercapacitor device according to claim 4, wherein the solid state ionic liquid further comprises inorganic nanoparticles.

6. The symmetric supercapacitor device according to claim 1, wherein the electrolyte provides at least one cation selected from: 1-ethyl-3-methylimidazolium (EMIm+), 1-propyl-3-methylimidazolium (PMIm+), 1-butyl-3-methylimidazolium (BMIm+), and at least one anion selected from: chloridion (Cl−), hexafluorophosphate ion (PF6−), bis(trifluoromethylsulfonyl)imide ion(TFSI−).

7. The symmetric supercapacitor device according to claim 6, wherein the solid state ionic liquid further comprises inorganic nanoparticles.

8. The symmetric supercapacitor device according to claim 1, wherein the electrolyte comprises 1-n-ethyl-3-methylimidazolium chloride, 1-n-propyl-3-methylimidazolium chloride, 1-butyl-3-methylimidazolium chloride and 1-butyl-3-methylimidazolium hexafluorophosphate.

9. The symmetric supercapacitor device according to claim 8, wherein the solid state ionic liquid further comprises inorganic nanoparticles.

10. The symmetric supercapacitor device according to claim 1, wherein the electrolyte comprises 1-butyl-3-methylimidazolium hexafluorophosphate, 1-Ethyl-3-methylimidazolium chloride and 1-Butyl-3-methylimidazolium hexafluorophosphate.

11. The symmetric supercapacitor device according to claim 10, wherein the solid state ionic liquid further comprises inorganic nanoparticles.

* * * * *